INVENTOR.
Fred J. Benson
George M. Lewis
by Edward C. Taylor
ATTORNEY.

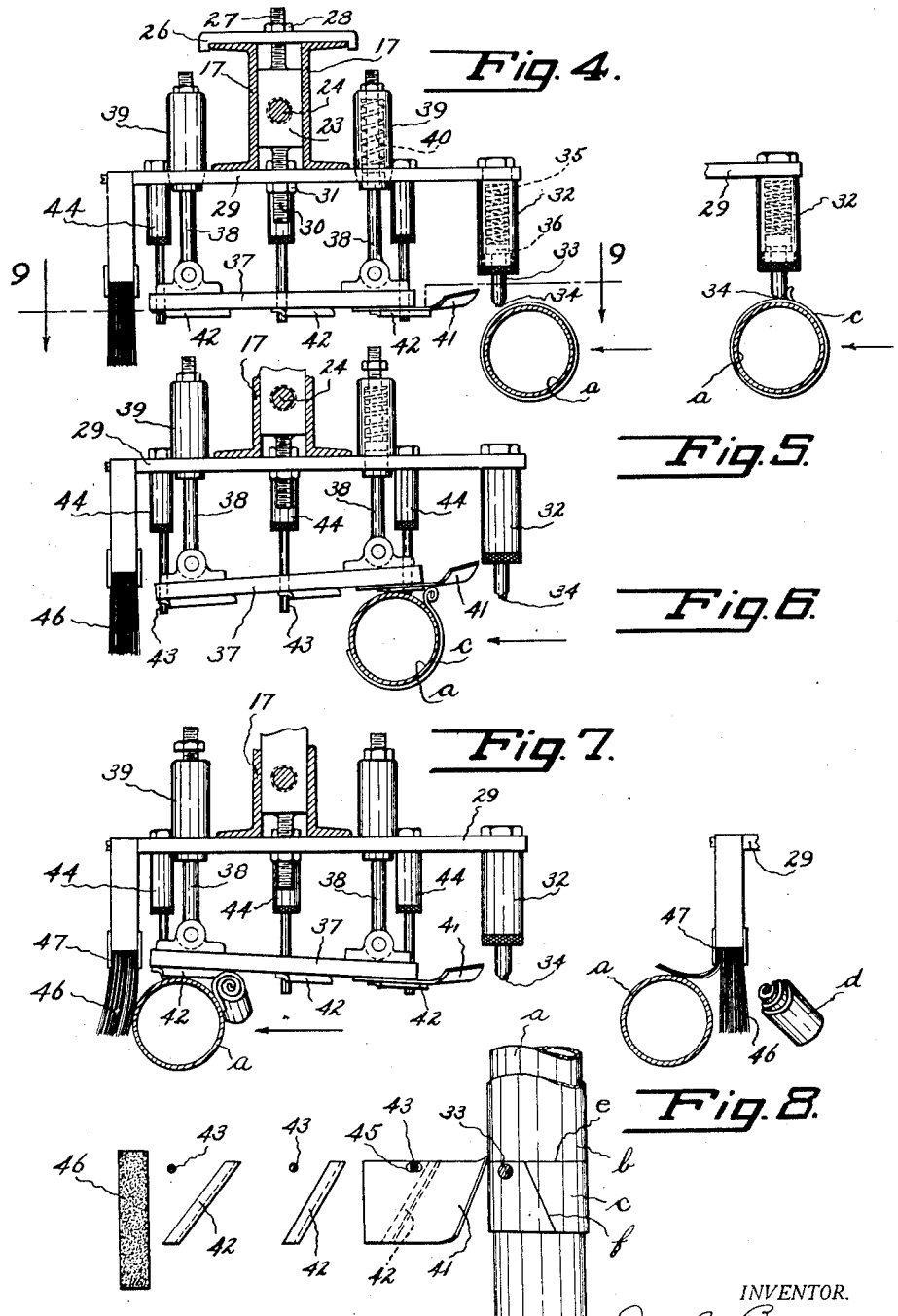

Patented Oct. 8, 1929

1,730,991

UNITED STATES PATENT OFFICE

FRED J. BENSON AND GEORGE H. LEWIS, OF CHICOPEE FALLS, MASSACHUSETTS, ASSIGNORS TO THE FISK RUBBER COMPANY, OF CHICOPEE FALLS, MASSACHUSETTS, A CORPORATION OF MASSACHUSETTS

METHOD AND APPARATUS FOR REMOVING TRIMMED WASTE FROM RUBBER TUBES

Application filed March 21, 1927. Serial No. 177,188.

This invention relates to a method and an apparatus for trimming rubber tubes to length while they are on the mandrel and for removing the waste therefrom. It has for its object the cutting of the tube and the removal of the trimmed waste without the necessity for any manual operation, the entire work of cutting and of removing the trimmed rubber being done by automatically operating devices.

Referring to the drawings,

Fig 4 is an enlarged side elevation of one of the waste removing devices showing a mandrel approaching the device;

Fig. 5 is a detail of the same apparatus showing the start of the waste removing operation;

Fig. 6 is a view similar to Fig. 4 but showing a later stage;

Fig. 7 is a similar view showing a still later stage;

Fig. 8 is a detail showing the manner in which the trimmed and rolled up waste is removed from the mandrel; and Fig. 9 is a section on line 9—9 of Fig. 4.

Figure 1:
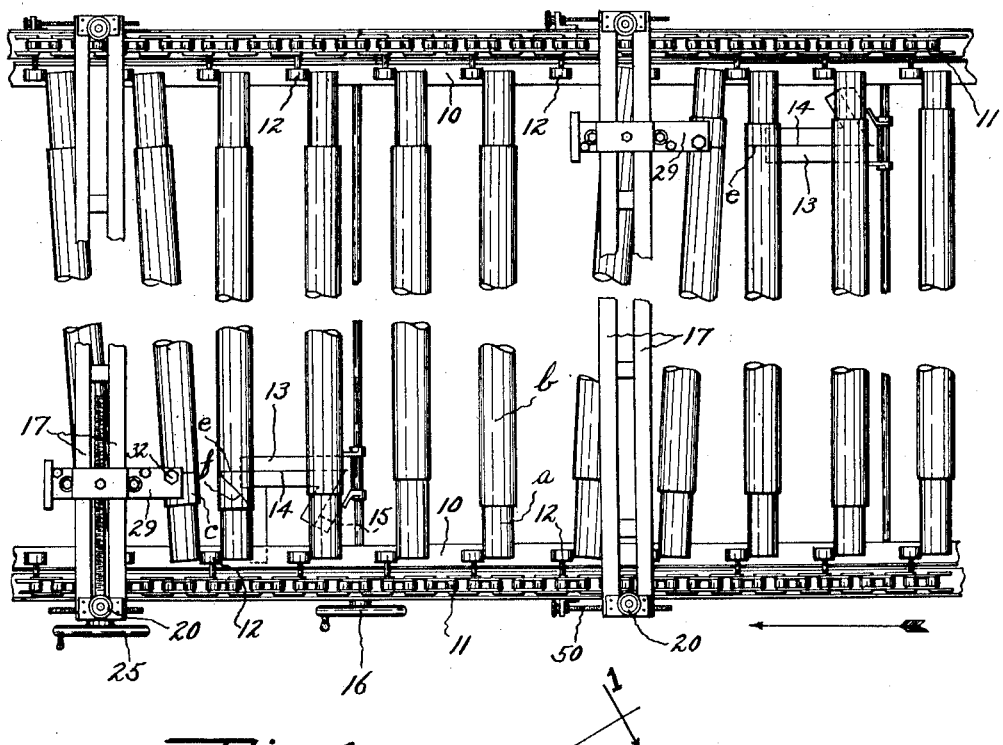
Fig. 1 is a top plan view, taken on line 1—1 of Fig. 2, of a unit for cutting both ends of a tube to length and for removing the waste therefrom.

The tubes are supplied upon mandrels $a$, the tubes themselves being indicated in the drawing by the letter $b$. These mandrels are supported on rails 10 along which they are carried by chains 11 having roller pushing members 12 at intervals therealong. The chains are given a constant motion in the direction of the arrow in Fig 1 by any suitable source of power which it is not necessary to illustrate. In the case shown the conveyor and the rails 10 are arranged at a descending angle, as indicated particularly in Fig. 2, as this arrangement corresponds with the tube building apparatus for which the apparatus was particularly designed. However, the cutting and waste removing apparatus would operate with equal or perhaps greater facility if the conveyor were arranged either flat or at an ascending angle.

Arranged one on either end of the mandrel are stationary frames 13, each carrying an electrically heated cutter 14 long enough to make a cut $e$ completely around the rubber tube $b$, thereby leaving a waste portion indicated in the drawing at $c$. Each frame 13 also carries a heated cutter 15 set at an angle to make a diagonal slit $f$ from the circumferential cut to the end of the tube. The two frames 13, as well as the two waste removing devices, are arranged in staggered relation since this avoids having both acting on the mandrel at the same time. Alternate action of the two ends of the waste removing apparatus to be described below is desirable as the operation of this device offers a certain resistance to the rotation of the mandrel and simultaneous operation on both ends might cause a temporary cessation of the mandrel rotation with a consequent failure of the waste removal function. One of the cutters has an adjustment 16 whereby it may be moved transversely of the machine to accommodate tubes of varying lengths. The electric cutter has not been described in great detail as it forms the subject of application Serial No. 69,125, filed November 14, 1925.

The apparatus for removing the trimmed waste $c$ is supported upon channels 17 running transversely from one side of the mechanism to the other. The channels are arranged in pairs, each pair being supported at each end from a post 18 by means of a threaded rod 19 secured to the post and having a hand wheel 20. A bridge 21 extends between the channels and bears underneath the hand wheel. A screw clamp 22 serves to secure the adjustment which is made by turning the hand wheel 20. By this construction the height of the waste removing device above the track 10 can be varied to accommodate mandrels of different diameters. To accommodate tubes of different length one device is supported, as will be described, from a block 23 having a screw-threaded adjustment rod 24 passing through it and bearing a hand wheel 25 at one end. By the use of this hand wheel one of the devices may be moved transversely so that tubes of varying length may be worked upon. It is generally not necessary to have both of the devices transversely adjustable, as the tubes may be positioned a constant distance from one end of the mandrel. Adjustment of the device towards and away from the trimming knife, which is desirable in order to have the removing operation start at the correct circumferential point on the mandrel, is accomplished by screws 50 threaded into the posts 18 and held against longitudinal movement in a bracket 51 attached to the rails.

The blocks 23 (that in the non-adjustable device being of course minus the screw-threaded rod) are held between the channels 17 by a top piece 26 through which passes a screw 27 secured to the block and having a nut 28 which bears against the upper side of the top piece. A main support 29 is positioned against the bottom of the channels and is held by screw 30 secured to the block and having nut 31 bearing against the main support. At one end of this support is a cylinder 32 into which fits a rod 33 having a plow-shaped point 34 which acts to start the removal of the waste portion c. This rod is yieldingly pressed downward by a spring 35 contained within the cylinder and bearing against a head 36 formed on the rod.

Located below the main support 29 is a board 37 pivoted to rods 38 which pass through cylinders 39 secured to the main support. Springs 40 inside these cylinders offer a resistance to upward motion of the rods and consequently carry the board 37 in a yielding manner. At one end of this board is a guide 41 bent upwardly and to one side, as shown in Figs. 4 and 9. Spaced from guide 41 along the board, but likewise arranged in a diagonal position, are ribs 42. These ribs are conveniently formed, as shown, of a thin piece of sheet metal bent over at approximately a right angle so as to present a comparatively sharp edge to the oncoming rubber. The inclination of the ribs to the axis of the mandrel progressively increases, as indicated in Fig. 9, in order to exert increasing force on the waste in a direction away from the body of the tube.

At the side of the board remote from the end of the mandrel are plungers 43, each mounted in a cylinder 44 and spring-pressed in the same manner as the plungers 33 and 38. The forward one of these plungers 43 passes through a slot 45 in the rear end of the guide plate 41 and the others pass through similar slots in support 29. Mounted rearwardly of the last plunger 43 is a brush 46 which may be of the same nature as the ordinary paint brush having bristles of a considerable elasticity. A metal or other backing 47 may be employed to give the brush rigidity.

Figures 2, 3:
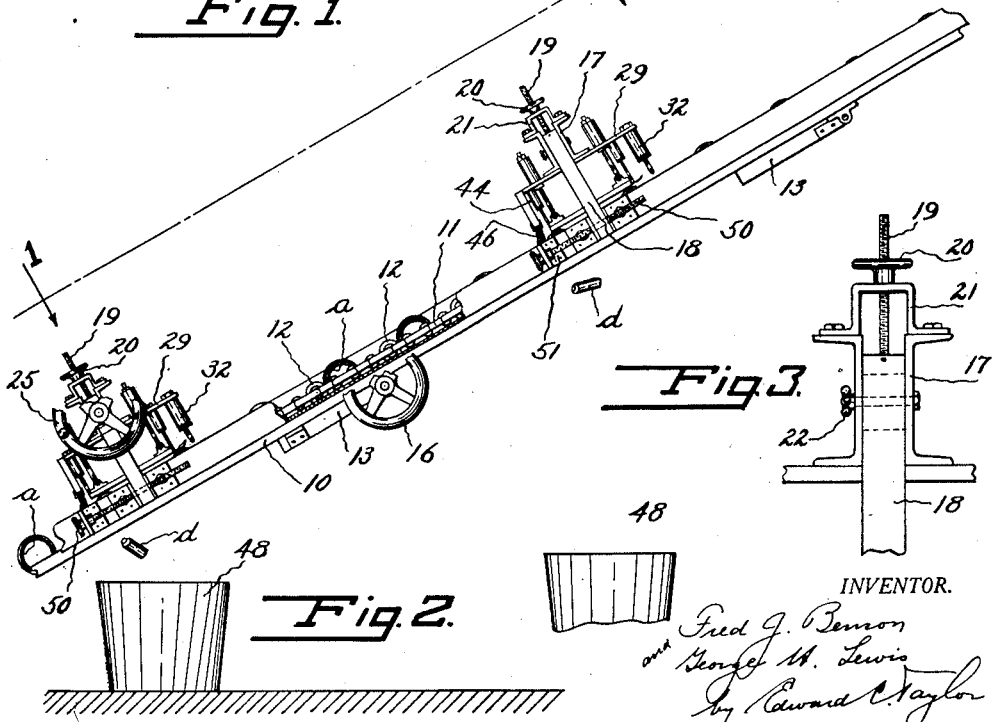
Fig. 2 is a side elevation thereof.
Fig. 3 is an enlarged end elevation of a detail showing the method of securing a vertical adjustment for the waste removing apparatus.

The operation of the device will now be considered with relation to Figs. 4 to 9 inclusive. It will be recalled that in the passage of the mandrel down the rails 10 the rubber near each end was cut circumferentially at e and a slit f formed from this circumferential cut to the end of the tube. The relation of the plunger 33 to the cutter is so chosen that it strikes the rubber as indicated in Figs. 4 and 5 just in advance of the diagonal slit and at a point near the circumferential slit (Fig. 9). The action of the plow point 34 is to dig up slightly a limited area of the trimmed waste as indicated in Fig. 5. Subsequent travel of the mandrel brings the turned up portion of the waste against the guide 41 and the foremost of the diagonal ribs 42. As shown in Fig. 6, this starts the waste rolling up into a compact cylinder. The diagonal arrangement of the ribs is of use in causing this cylinder to roll away from the body of the tube b and thereby to avoid sticking of the waste to the tube proper. Further rolling of the waste is accomplished by the other ribs 42 and the diagonal direction of the roll is insured by the presence of the rods 43 which, in case the cylinder starts in the wrong direction, give it a tilt toward the mandrel end. In case the rolled up cylinder d of waste has not fallen off, the brush 46, as indicated in Fig. 8, gives a slight flip which knocks it off and causes it to fall into a basket 48 placed underneath the waste removing device. The whole apparatus, being mounted upon springs, gives a yielding action which effectively prevents binding or jamming as the mandrel passes under it, and at the same time furnishes an even pressure. The board 37 tilts somewhat as shown in Figs. 6 and 7 as the mandrel passes along. In Fig. 1 some of the mandrels have been shown as slightly slanting or out of their straight position. This is due to the resistance offered by the waste removing devices and gives no trouble as the mandrel is pushed along positively by the next succeeding roller 12.

Having thus described my invention, I claim:

1. In combination, means for cutting circumferentially the end of a rubber tube while on a mandrel, means for slitting the tube from said cut to the tube edge, and means for rolling up the trimmed waste beginning at the slit.

2. In combination, a conveyor for tube mandrels with rubber tubes thereon, a heated cutting die past which the tubes are successively rolled by the conveyor, formed to cut the end of the tubes circumferentially and to slit the tube from said cut to the tube edge, and means past which the mandrel is carried by the conveyor for engaging the trimmed waste and rolling it up.

3. A device for removing the waste from a trimmed uncured rubber tube comprising a plow to loosen the waste, and means for engaging the waste and rolling it upon itself to form a compact adherent mass.

4. A device for removing the waste from a trimmed rubber tube while on a mandrel comprising a plow to loosen the waste, a plurality of waste engaging members spaced apart and set at an angle to the axis of the tube, and means for moving the waste into contact with said members.

5. A device for removing the waste from a trimmed rubber tube while on a mandrel comprising surfaces upon which the ends of the mandrel may roll, means for rolling the mandrel along said surfaces, and a waste engaging device located on the opposite side of the mandrel from said surfaces, said device being provided with a waste engaging face whereby the trimmed waste is progressively rolled up during the travel of the mandrel.

6. A device for removing the waste from a trimmed rubber tube while on a mandrel comprising surfaces upon which the end of the mandrel may roll, means for rolling the mandrel along said surfaces, and a plurality of members successively engaging the end of the tube on the opposite side of the tube from the supporting surface, said members operating to roll up the waste in a direction at an acute angle to the axis of the tube.

7. A method of trimming to length a rubber tube located upon a mandrel which comprises cutting the tube circumferentially of the mandrel, slitting the tube from the circumferentially cut to the adjacent tube end, and rolling up the trimmed waste progressively around its circumference.

8. A method of removing the trimmed waste from the end of a tube located upon a mandrel which comprises turning up a portion of the waste, and rolling up the waste progressively around the circumference of the tube.

FRED J. BENSON.
GEORGE H. LEWIS.